United States Patent [19]

Jones

[11] 4,449,384
[45] May 22, 1984

[54] WASHING APPLIANCE CONTROL CIRCUITRY

[75] Inventor: William H. Jones, Villa Park, Ill.

[73] Assignee: Eaton Corporation, Cleveland, Ohio

[21] Appl. No.: 405,029

[22] Filed: Aug. 4, 1982

[51] Int. Cl.³ .............................................. D06F 33/02
[52] U.S. Cl. .................................. 68/12 R; 307/141.4
[58] Field of Search ............ 68/12 R; 307/141, 141.4, 307/141.8; 134/57 R, 57 D, 58 R, 58 D

[56] References Cited

U.S. PATENT DOCUMENTS

| | | | |
|---|---|---|---|
| 3,260,866 | 7/1966 | Martin | 307/141 |
| 3,398,295 | 8/1968 | Fathauer | 68/12 R |
| 3,477,258 | 11/1969 | Walker et al. | 307/141 X |
| 3,662,186 | 5/1972 | Karklys | 68/12 R |
| 3,783,651 | 1/1974 | Karklys | 307/141 X |
| 4,001,599 | 1/1977 | Karklys | 68/12 R X |
| 4,104,542 | 8/1978 | Karklys | 307/141.4 X |
| 4,120,013 | 10/1978 | Simmons | 68/12 R X |

Primary Examiner—Philip R. Coe
Assistant Examiner—Frankie L. Stinson
Attorney, Agent, or Firm—Fay & Sharpe

[57] ABSTRACT

An appliance control circuit particularly adapted for controlling a washing appliance such as a washing machine or a dishwasher is provided. The invention is comprised of a timer interval selector switch including a program cam defining an operational cycle for operation of the washing appliance. A hybrid timer control circuit including an escapement device and a memory and logic circuit is provided for amending advancement of the program cam during operation of the appliance. The escapement device includes a timer interval selector switch in association with the program cam for generating selective binary coded control signals. A binary-coded-decimal to decimal decoder/driver decodes the binary signals into decimal signals which are operatively connected to a plurality of selected capacitance means and an interval timer. The interval time base interval between advancement steps of the program cam is determined by selection of particular capacitance means. The memory and hybrid timer logic control circuit includes program selector switches which may be compared in the logic circuitry with the program cam for selectively rapidly advancing the program cam in accordance with the particular selected program defined by the selector switch.

8 Claims, 3 Drawing Figures

WASHING APPLIANCE CONTROL CIRCUITRY

Background of the Invention

This invention pertains to the art of appliances and appliance control circuitry and, more particularly, to the electrical control circuitry of a washing appliance intended for domestic or household use.

The invention is particularly applicable to use on a washing appliance commonly called a washing machine and may also be employed for control of a dishwasher. However, it will be appreciated to those skilled in the art that the invention could be readily adapted for use in other apparatus and devices as, for example, where similar control circuitry is employed to control the operation of machinery.

Conventional washing appliance control circuitry has generally comprised electro-mechanical switching devices controlled by a mechanical programmed cam. Typically, a selector dial/knob is provided on the appliance console for activating the appliance operation and selecting the desired program wash cycle. The selector dial/knob includes a programmed cam including a plurality of electrical switch contact pads or cam tracks for controlling the operational cycle of the appliance. The programmed cam is typically rotatable and the operational cycle may be defined by an entire 360° revolution of the cam or a mere portion thereof. Conventional power means for advancing the cam are provided. Typical phases of the operational cycle include filling the appliance with washing liquid, agitating the liquid and articles contained in the liquid for washing, draining the washing liquid from the appliance, rinsing the washed articles, draining the rinsing liquid and spin drying the washed articles. Each of these segments of the operational cycle may consume a different amount of time. It has, therefore, been necessary to include control circuitry to define the appropriate amount of time for each segment of the cycle. Typical prior art appliance control circuitry has included a single switch and associated timer control circuitry for defining a proper distinct interval time for each segment. Such interval time circuitry has typically comprised a conventional resistor/capacitor circuit whereby the interval may be varied by varying the value of the resistor or capacitor. The time segment of an operational cycle may comprise the time between rotational step advances of the program cam, or a plurality of step advances in combination with an associated interval.

The various forms and types of appliance control circuitry that have heretofore been suggested and employed in the appliance industry have met with varying degrees of success. It has been found that the defects present in most prior control circuitry systems are such that the circuitry systems are of limited economic and practical value.

One particular problem of prior art appliance control circuitry systems was that the systems required one distinct switch for each distinct time interval or time base to be employed between step advances of the program cam in the operational cycle of the appliance. For example, if eight different time base intervals are required for an operational cycle, the control circuitry required eight distinct switches and associated timing control circuitry for defining the proper base interval. It has long been sought in the industry to simplify the interval time selection switch network by reducing the number of switches required in the network and thereby further simplifying and improving the associated timing control circuitry.

Another particular problem of prior art systems has been the poor electrical life of switches exposed to repeated opening and closing of circuits carrying voltage and current at a level necessary to operate appliance motors. The p.c.b. burns from resulting arcing and tracking has caused false switching. The industry has sought a solution to such problems of repeated operation of an electro-mechanical switch during a single segment of the operational cycle of the appliance particularly where the segment is defined by a large number of step advances of the programmed cam, each step comprising a relatively small angular gradation of the cam.

Prior appliance control systems of all electronic construction have also suffered from the problems of reduced reliability naturally occurring when electronic components are required to switch the currents and voltages necessitated in operation of appliance motors. In addition, all electronic control systems have been particularly costly to manufacture.

The industry has also long sought to provide an appliance control circuit that provides a greater degree of flexibility both in determining time base intervals and in determining variations in duration of operational cycle segments in accordance with the type of articles to be washed.

The present invention contemplates a new and improved device and appliance control circuitry which overcomes all of the above referred to problems and others to provide a new washing appliance control circuit which is economical to manufacture, highly reliable in operation, readily adaptable to a plurality of timing control uses with appliances having a variety of timing and control characteristics and needs, and which provides improved appliance operation and flexibility in operation.

BRIEF SUMMARY OF THE INVENTION

In accordance with the present invention, there is provided washing appliance control circuitry particularly suited for controlling the operational cycle life of a washing machine. The new control circuit is generally comprised of a hybrid timer logic control circuit, an electronic escapement device and a water level sensor control. The control circuit includes a plurality of selectively operable touch switches for selecting particular operational cycle programs. The escapement device includes a timer interval selector switch in association with the program cam for generating binary coded selective control signals, timer/decoder means for translating the selective control signals into associated timer signals and advancing circuit means for automatically advancing the program cam in response to the timer signals of the timer/decoder means. The timer/decoder means preferably comprises a binary-coded-decimal to decimal decoder/driver in operative connection to a plurality of selected capacitance means and an interval timer. The selected capacitance means is selectively chargeable in response to an associated one of the control signals of the timer interval selector for associated selective control of the timer signals.

In accordance with another aspect of the present invention, the control circuit includes memory and logic means including selectively operable switch means for selective rapid advancement of the program cam.

In accordance with a further aspect of the present invention, the control circuit further includes a plurality of program selector switches in association with the memory and logic means whereby selective operation of the program selector switches is compared in logic circuitry with the program cam of the timer interval selector switch for selective amendment of the operational cycle.

In accordance with a more limited aspect of the present invention, the logic circuitry includes a decoder/driver including a plurality of outputs, each of which is associated with an associated one of the plurality of program selector switches whereby upon operation of the one program selector switch and energization of the associated output of the decoder/driver, the program cam is rapidly advanced until de-energization of the associated output.

One benefit obtained by use of the present invention is an escapement device for a washing appliance which reduces the number of switches required for interval time definition of the base interval between step advances of the appliance program cam.

A further benefit of the present invention is an escapement device which provides improved switch life in a step switch for advancing the program cam.

Yet another benefit of the present invention is an appliance control circuit which employs binary-coded control circuitry to control electro-mechanical switching operations in an appliance.

Another benefit obtained from the present invention is an appliance control circuit which provides improved flexibility in amendment of operation of an operational cycle for a washing appliance.

Other benefits and advantages for the subject new control circuit will become apparent to those skilled in the art upon a reading and understanding of this specification.

BRIEF DESCRIPTION OF THE DRAWINGS

The invention may take physical form in certain parts and arrangements of parts, the preferred embodiment of which will be described in detail in the specification and illustrated in the accompany drawings which form a part hereof and wherein.

DETAILED DESCRIPTION OF THE INVENTION

Figure 1:
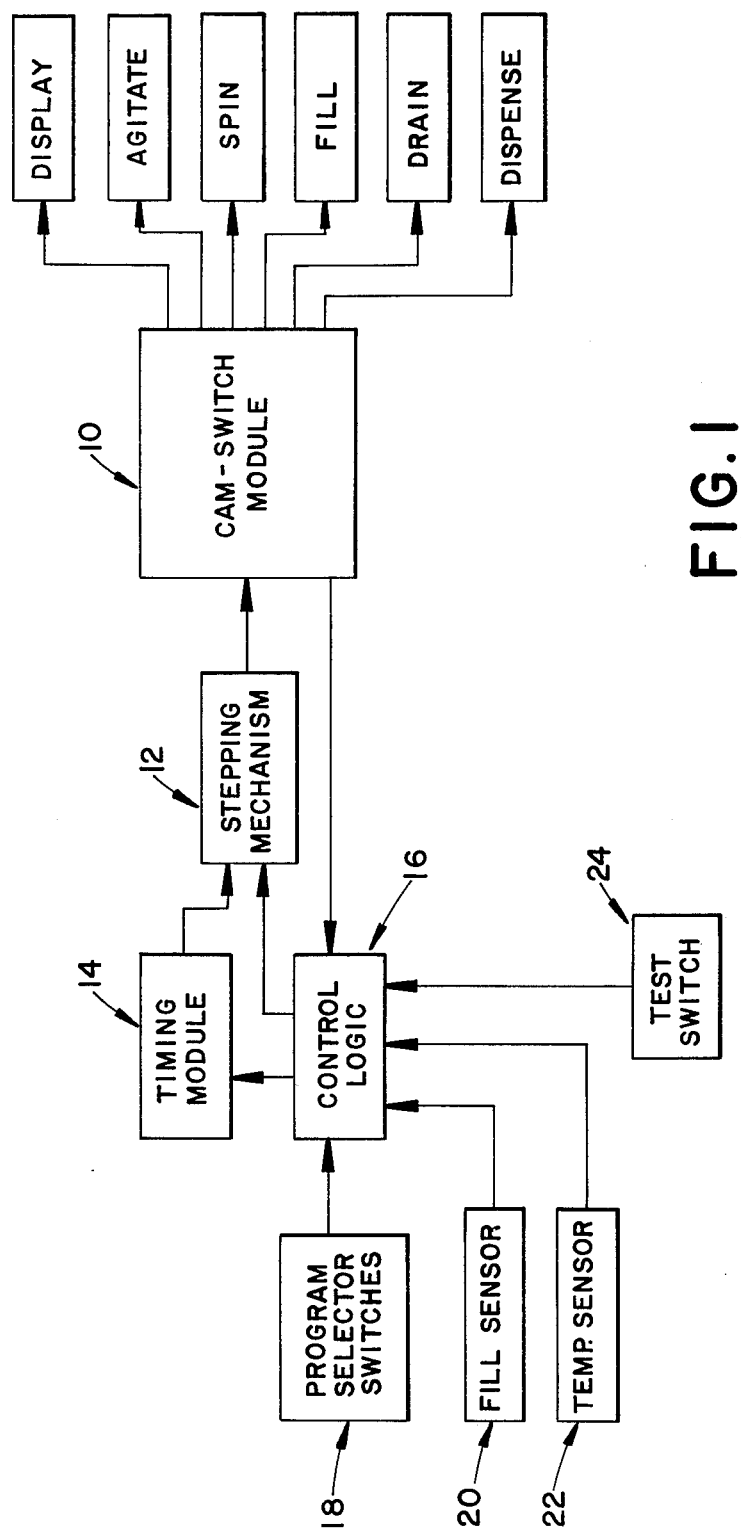
FIG. 1 is a block diagram of a control circuit formed in accordance with the present invention.

Referring now to the drawings wherein the showings are for purposes of illustrating the preferred embodiment of the invention and not for purposes of limiting same, the FIGURES show an electrical control circuit for washing appliances such as a domestic washing machine or dishwasher. The invention comprises a hybrid electrical control circuit combining the advantages of an electro-mechanical timer switching circuit with the logic and timing functions and advantages of an electronic circuit. It has been found that such a circuit has a much higher level of reliability than either an all solid state control circuit or an all electro-mechanical control circuit and yet is much less costly to manufacture than an all solid state control circuit.

More specifically, and with reference to FIG. 1, an appliance control circuit must be capable of controlling and actuating several functions of the associated appliance. Some of these functions include filling with washing liquid, agitating, dispensing cleaning materials, draining, rinsing, and spinning dry. Additional and alternative operational functions may also be included depending upon whether the washing appliance is a dishwasher or washing machine. The various functions performed by the appliance in the entire washing operation comprise the operational cycle of the appliance.

The particular operations of the appliance are directly controlled by operational signals from the cam switch module 10. The cam switch module 10 includes the programmed cam in operative engagement to a selector dial/knob provided on the console of the washing appliance for activating the machine operation and selecting the programmed wash cycle. Conventionally, the operator activates the machine by rotating the selector dial to the chosen wash cycle program setting and then the dial/knob is pulled out away from the console face to start the power up to the control circuit. The program cam is then rotated or advanced to effect switching operations in accordance with the functional segments of the operational cycle of the appliance. An escapement device is included in the cam switch module 10 to prevent continuous advancement of the program cam. The program cam thus "escapes" powering by a timer motor and dwells at a position until the control circuit signals coupling of the cam to the driving timer motor.

A stepping mechanism 12 is employed to effect advancement or rotation of the program cam a step degree by coupling of the cam and motor. It is a particular feature of the invention that the electro-mechanical operation of the stepping mechanism and associated advancement of the program cam is electronically varied to include intervals between angular rotation steps varied according to the particular program setting selected by the operator of the appliance, as will hereinafter be more fully explained. The stepping mechanism 12 requires energization signals from both timing module 14 and a control logic circuitry 16. Control logic circuitry 16 receives input from the operator through program selector switches 18 and feedback input identifying the position of the program cam from the cam switch module 10. It is within the scope of the invention to include a plurality of program selector switches which, for example, may include selected programs entitled "soak and scrub", "normal wash", "heavy wash", "light wash", "fast wash", "rinse and hold" and "cancel drain". Each of the programs involve different advancement procedures of the program cam to define the selected program. The selected advancement will be controlled by the control logic circuitry 16 and timing module 14.

Additional features of the invention include a water level control or fill sensor 20 to sense filling of the wash liquid in the appliance or overflow of the wash liquid, a temperature sensor 22 for sensing water or wash liquid temperature and a test switch 24 for rapid advancement of the program cam in a situation where a maintenance operator desires rapid operation of the program through a full operational cycle to test operation of the appliance.

Figure 2:
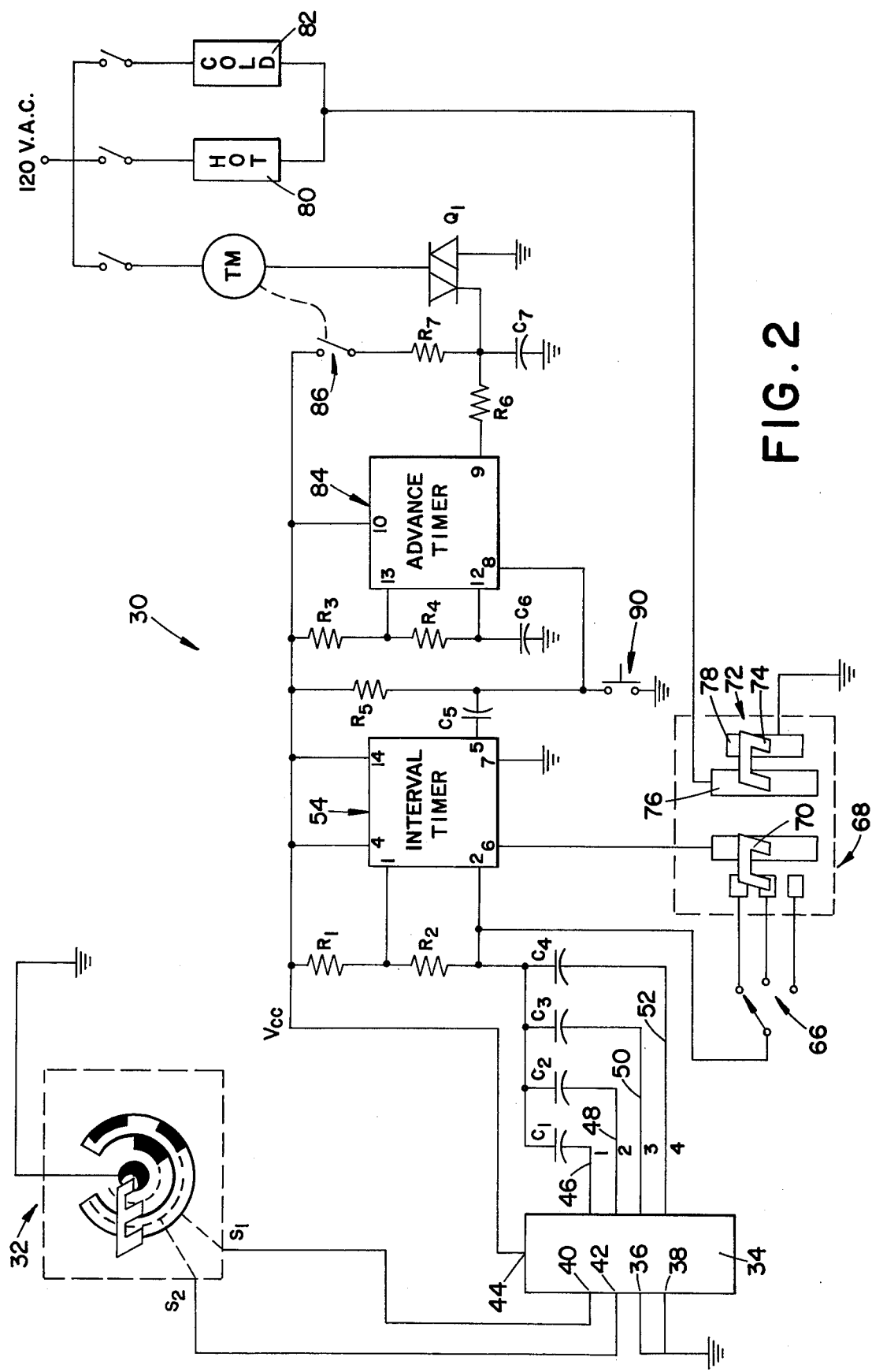
FIG. 2 is a schematic diagram of an electronic escapement device formed in accordance with the present invention; and, FIG. 3 is a schematic diagram particularly showing the logic circuitry of an appliance control circuit formed in accordance with the present invention.

With particular reference to FIG. 2, a feature of the invention comprising an electronic escapement device 30 is particularly disclosed. The escapement device 30 provides a novel method of operation for electronic interval control for a conventional electro-mechanical timer of a washer appliance. The new escapement device reduces the number of switches required to produce various and distinct time base intervals between step advancements of the program cam. The use of a binary logic network provides that the number of time base intervals produced by the network is related in an expedential manner to the number of switches. For example, one single pole, single throw switch can produce two different time base intervals. Two switches can produce four different time intervals, while just three switches are needed to generate eight different time intervals. Using two as a base and the number of switches employed as the exponent of the base, the number of available time intervals may thus be computed.

FIG. 2 includes a timer interval selector switch 32. The interval selector switch illustrated includes two binary switches S1, S2 although it is within the scope of the invention to include additional binary switches. The interval selector switch 32 comprises conventional printed circuitboard rings and an electrical wiper or contact member for relative rotation to the rings and selective closing of switches S1 and S2. Typically, the printed circuitboard switches are affixed to the back side of the program cam (not shown). The binary switches S1, S2 are operatively connected to an integrated circuit comprising a binary-coded-decimal to decimal decoder/driver device 34. The decoder/driver device 34 may comprise a type 7441 or type CD4028 integrated circuit. The decoder/driver device 34 is illustrated as including available inputs for receiving selective control signals of four binary switches; however, in the embodiment of the invention illustrated, two of the inputs 36,38 are grounded while the other two inputs 40,42 are connected to the binary switches S1, S2 respectively. The decoder/driver device 34 also includes an input 44 for operative connection to a source of electrical energy $V_{cc}$. Each of the binary switches S1, S2 may generate a binary logic "0" upon closure and a binary logic "1" upon opening to define, in combination, a two digit binary code signal. The decoder/driver device 34 operates to decode the two digit binary code signal into a decimal signal defined by a selective one of the four illustrated outputs 46,48,50,52 of the decoder/driver. Output 46 would correspond to a decimal zero "0" and a binary zero "00". Output 48 would correspond to a decimal one "1" and a binary one "01". Output 50 would correspond to a numerical two "2" and a binary two "10", and output 52 would correspond to a numerical three "3" and a binary three "11". Only one of the outputs 46,48,50,52 would be energized depending upon the input signal from the binary switches S1, S2. It thus may be seen that the invention employs two switches to produce four distinct output signals.

The four distinct outputs from the decoder/driver device 34 are each separately contacted to various capacitors in an RC network to produce various base interval times between pulses from interval timer 54. Specifically, output 46 is connected to capacitor C1, output 48 is connected to capacitor C2, output 50 is connected to capacitor C3 and output 52 is connected to capacitor C4. In the preferred embodiment of the invention, capacitor C1 has a value of 2.2 mf, 6 V tantalum; C2 has a value of 6.8 mf, 6 V tantalum; C3 has a value of 15 mf, 20 V tantalum; and, C4 has a value of 47 mf, 6 V tantalum. The capacitors are connected to interval timer 54 and resistors R1,R2, which preferably having a value of 2.5 megaohms, adjustable and 33K ohms ¼ W, respectively. Specifically, the output of the decoder/driver will connect just one capacitor (C1 through C4) to ground through its internal circuitry. The selected capacitor to be grounded is based upon the input code. For example, if both input switches are closed ("00"), output "0" at output 46 is in use. The capacitor C1 will be grounded, resulting in C1 establishing the RC timing interval for the interval timer 54. It is also within the scope of the invention to include various combinations of capacitors to also determine the RC constant and ultimately the base interval for the interval timer network.

Interval time is based on the equation:

$$\text{Time} = 0.685(R_1 + R_2)C_x \text{ seconds}$$

where x corresponds to the subscript of capacitors C1 through C4. The following truth table advantageously illustrates the operation of the invention:

| Binary Input Code S1,S2 | Decimal Output Code | Interval Time |
| --- | --- | --- |
| 00 | 0 | 4 seconds |
| 01 | 1 | 12 seconds |
| 10 | 2 | 24 seconds |
| 11 | 3 | 80 seconds |

(1 = open; 0 = closed)

Accordingly, when the input code is changed, the associated one of capacitors C1 through C4 will be selected. By using the different capacitance values for each capacitor, different interval times can be obtained. Thus, the interval time during which the cam dwells in an escaped situation from the driving cam timer motor will ultimately vary during the operational cycle.

In a clothes washer, it is necessary to stop the timer while the machine fills with water. User switch 66 and pressure switch 68 may be advantageously employed to effect this operation. As illustrated, the user switch 66 allows selection of three different levels of water or washing liquid which may be allowed to flow into the appliance. Switch 68 comprises a pressure switch preferably comprising circuitboard contact means including at least one electrical contact member on the surface thereof being operatively connected to a pressure responsive member of the washing appliance for movement in accordance with the pressure increase in the appliance in accordance with the filling of the water. The surface contact member is slidably and selectively contactable to associated electrical contact means whereby upon non-closure of contact between the surface electrical contact member and the associated electrical contact means, the pressure switch operates to inhibit operation of the interval timer 54. In other words, not until the slidable contact member 70 closes the circuit between pins 2 and 6 of interval timer 54, will the timer run to ultimately allow advancement of the program cam.

An overflow safety switch 72 is also preferably included and comprises a similar construction to the pressure switch 68. The overflow safety switch 72 is electrically connected such that upon opening of contact between the surface electrical contact members 74 and the associated electrical conductors 76,78 the overflow safety switch operates to terminate the flow of washing liquid to the washing appliance by closing the hot and cold water fill valves 80,82.

When pressure switch 68 closes, signalling a full tub of water, interval timer 54 is reset. For drain and spin segment functions of the operational cycle of the washing appliance, it will be necessary to bypass pressure switch 68 with a switch in the interval timer 54, in order to keep the interval timer operating when the water level pressure switch contacts open up.

Interval timer 54 and advance timer 84 preferably comprise a type 556 integrated circuit timer. The operation of such integrated circuit timers is well known by persons skilled in the art. The advance timer 84 is effectively under the control of the interval timer 54. After the selected interval time has elapsed based on the selected capacitance value (C1 through C4), the output voltage at pin 5 of interval timer 54 goes to ground. Through capacitor C5 this negative pulse is injected into pin 8 of advance timer 84. The advance timer 84 resets and starts timing. The output at pin 9, which had been at ground potential, goes up to a pulse input voltage, typically three to four volts. This input voltage appearing at the gate of triac Q1 causes it to turn on. The clock motor TM will run, and advance the main program cam one angular position. When the advance timer 84 has completed its cycle, typically in the range of one second, the output voltage at pin 9 drops to zero. The triac shuts off at the end of the next half cycle of the AC voltage wave. The clock motor TM stops.

To be able to insure a precise angular advancement, it has been found advantageous to provide a step advance switch 86. The contacts of step advance switch 86 close after the clock motor TM has moved a small angle. The contacts would remain closed up until completion of the angular advance, then open. In the preferred embodiment of the invention illustrated, the electrical load across step advance switch 86 is only approximately 7 milliamps at less than 5 volts DC. Such construction provides improved switch life over prior art systems which typically open the inductive clock motor sixty times during a typical wash program. The p.c.b. burns from arcing, and tracking had caused false switching; however, in accordance with the present invention the relatively low load across step advance switch 86 provides substantial improved life and operation.

Thus, it may be seen that the decoder/driver device 34 in combination with the RC network, interval timer 54 and advance timer 84 operates to provide a timer decoder for translating the selective control signals generated by the timer interval selector switch into associated timer signals. The timer signals operate to control a motor for advancing the program cam of the timer interval selector switch.

It is another feature of the invention that a test switch 90 is included in the escapement device to provide a functional means for a service man to quickly step the escapement device through a segment of the operational cycle without waiting for the interval timer to run its normal course. Each momentary contact closure of test switch 90 will cause the clock motor TM to advance one step. If the test switch 90 is held closed continuously, the motor will cause the timer to continue to advance until it is released.

Additional circuit element values for the illustrated circuit of FIG. 2 included:

| | |
|---|---|
| $C_5$ | .002 mf., Ceramic |
| $C_6$ | 33 mf., 10 V Tantalum |
| $C_7$ | .1 mf., 200 V Ceramic |
| $R_3$ | 100k ohms, adj. |
| $R_4$ | 22k ohms, ¼ W |
| $R_5$ | 33k ohms, ¼ W |
| $R_6$ | 100 ohms, ½ W |
| $R_7$ | 100 ohms, ½ W |
| $Q_1$ | TC 0440 I.T.T. triac |

Figure 3:
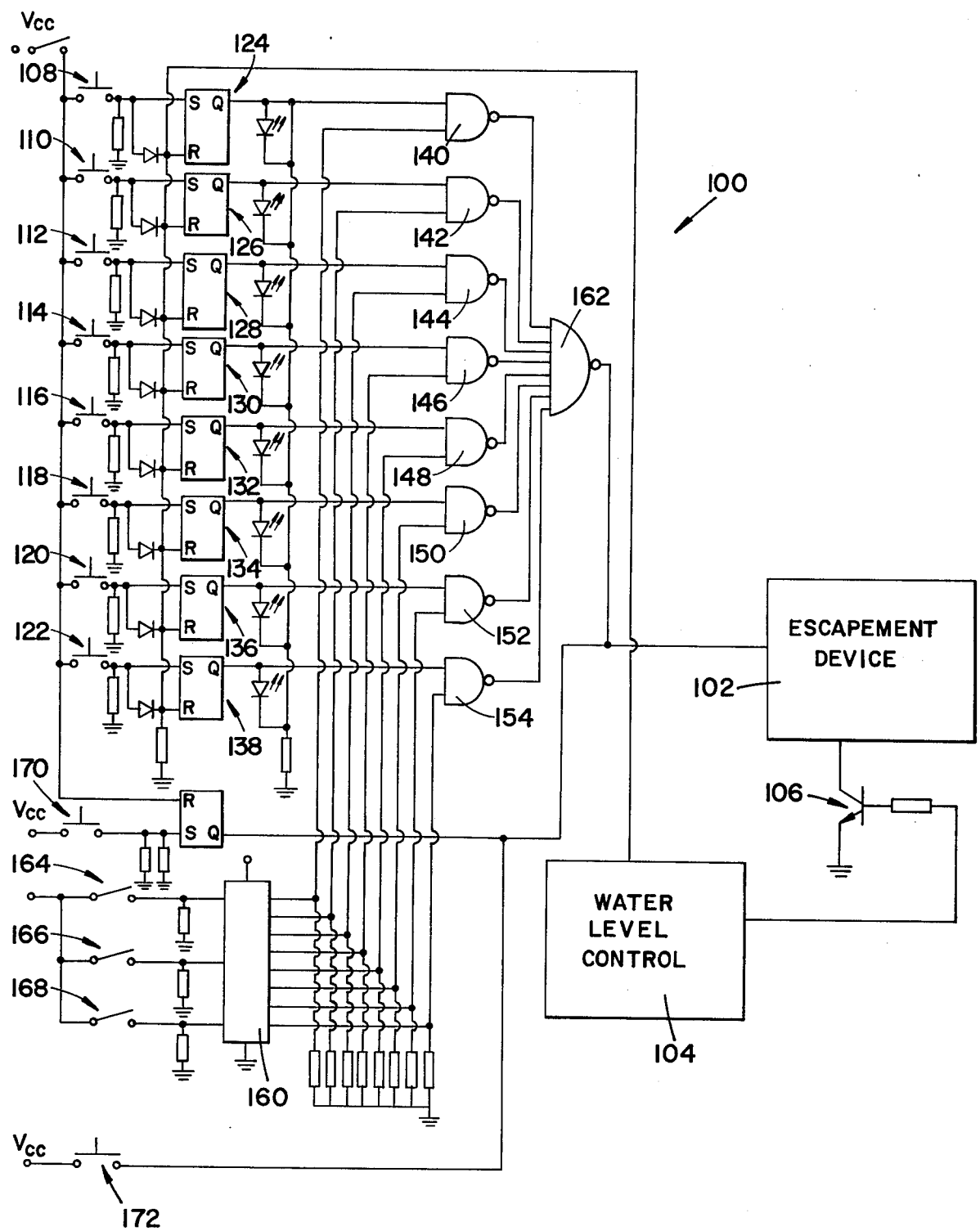

With particular reference to FIG. 3, the logic circuitry of the control circuitry of the invention is particularly shown comprising a hybrid timer memory and logic control circuit 100. Control circuit 100 generally operates to further control the timing operation of a washing appliance and provides a memory arrangement whereby an operator of the appliance may select a particular program for the operational cycle of the appliance. The control circuit 100 operates to rapidly advance the program cam in accordance with the functional operations of the selected program. An escapement device 102 comprising the circuitry previously disclosed in FIG. 2 is operatively engaged to control circuit 100. A water level control 104 is also provided and may comprise the user switch 66, the pressure switch 68 and the overflow safety switch 72 of FIG. 2 but preferably comprises the liquid level sensing circuit disclosed in applicant's copending U.S. patent application, Ser. No. 25,828 filed Apr. 2, 1979. Transistor switch 106 is provided to disable the escapement device 102 until the water level control senses the proper amount of water in the washing appliance.

With continued reference to FIG. 3, it may be seen that control circuit 100 includes a plurality of identical touch selector switches 108 through 122 each of which are electrically connected to an associated SR flip-flop 124 through 138. The output of each of the flip-flops is connected to one input of an associated dual nand gate 140 through 154. The other input to each of the dual nand gates is connected to an associated output pin of a binary-coded-decimal to decimal decoder/driver 160. The outputs of the dual nand gates comprise inputs to an octal nand gate 162 whose output is connected to the escapement device 102. Decoder/driver 160 is illustrated as having an input comprised of three separate switches 164,166,168 which correspond to a three digit binary coded input signal that may be decoded into eight distinct decimal output signals in a manner similar to the operation of the decoder/driver 34 of the escapement device (FIG. 2). Switches 164,166,168 comprise switches on the program cam of a washing appliance control knob.

Control circuit 100 operates as a memory and logic device to allow an operator to specify a particular program which will amend the advancement of the program cam in combination with the escapement device to provide the desired operational cycle. Touch selector switches 108 through 122 may correspond to program selections such as "soak and scrub", "normal wash", "heavy wash", "light wash", "fast wash", "rinse and hold" and "cancel drain" or alternative program selections and titles. An operator, upon selecting a particular program, would press the associated touch selector switch to provide an output at the associated flip-flop output and power an associated indicator, such as a light-emitting diode. For example, it may be seen that if touch selector switch 114 is operated, flip-flop 130 receives an input at its set input while all the other flip-flops receive a pulse at their reset input along a reset bus. The high output from flip-flop 130 would be transmitted to one input of dual nand gate 146. When the program cam is advanced such that the switch combination of switches 164,166,168 provides an output pulse at the second input for dual nand gate 146, the output of dual nand gate 146 will go low and, accordingly, the output of octal nand gate 162 will go high. Such logic operation will operate to advance the escapement device until the program switch combination changes to change the input to dual nand gate 146 and dual nand gate 146 goes high.

It may be seen that if none of the program selector switches 108 through 122 are operated, the program cam will undergo advancement which is controlled merely by escapement device 102. Such operation and control would correspond to the longest possible operational cycle for the washing appliance. Switch 170 operates as a cancel switch to cancel any preselected program. Switch 172 is provided as a start switch for the circuit.

The invention thus includes improved and novel circuitry for providing time base intervals between step advances of a program cam and for rapidly advancing the program cam in accordance with the desired operational functions of a preselected wash program.

It has been described with reference to the preferred embodiment. Obviously, modifications and alterations will occur to others upon a reading and understanding of the specification. It is my intention to include all such modifications and alterations insofar as they come within the scope of the appended claims or the equivalents thereof.

Having thus described my invention, I now claim:

1. An electrical control circuit including an escapement device for controlling operation of a washing appliance comprising:
   a source of electrical energy for powering said escapement device;
   timer interval selector switch means for generating selective control signals;
   timer decoder means for translating said selective control signals into associated timer signals, said decoder means comprising a binary-coded-decimal to decimal decoder/driver in operative connection to a plurality of selected capacitance means and an interval timer, each of said plurality of selected capacitance means being selectively chargeable in response to an associated one of said control signals of said timer interval selector for associated selective control of said timer signals; and,
   advancing circuit means for advancing said timer interval selector switch means in response to said timer signals of said timer/decoder means.

2. The control circuit as defined in claim 1 further including selectively operable test switch means for selective advancement of said timer interval selector switch means.

3. The control circuit as defined in claim 1 further including pressure switch means for sensing overflow pressure of a washing appliance.

4. The control circuit as defined in claim 3 wherein said pressure switch means comprises circuit board means including at least one electrical contact member on the surface thereof, said circuit board means being operatively connected to pressure responsive means of said washing appliance for movement therewith and having said surface contact member slidably and selectively contacting associated electrical contact means whereby upon opening of contact between said surface electrical contact member and said associated electrical contact means said pressure switch means operates to terminate flow of washing liquid to the washing appliance.

5. The control circuit as defined in claim 1 wherein said timer interval selector switch means comprises circuit board means including a plurality of electrical contact members and means for effecting electrical connection between said contact members for defining a plurality of electrical switches; said means for effecting electrical connection comprising a selectively advanceable connector and power means for advancing said connector in response to said timer signals.

6. The control circuit as defined in claim 1 wherein said advancing circuit means includes a step advance switch in operative engagement to a timer motor, said step advance switch operating to advance said timer interval selector switch means upon energization of said timer motor, said step advance switch being in electrical connection to a relatively low voltage in comparison to an applied voltage to said timer motor.

7. The control circuit as defined in claim 1 wherein said timer interval selector switch comprises a first switch and a second switch, said first and said second switches being electrically connected to an associated first and second decoder/driver input connector of said timer/decoder means, each of said first and second switches generating a binary logic "0" upon closure and a binary logic "1" upon opening to define, in combination, a two digit binary code signal.

8. The control circuit of claim 7 wherein said binary-coded-decimal to decimal decoder/driver operates to decode said two digit binary code signal into a decimal signal defined by a selective one of said plurality of selected capacitance means, said plurality comprising four capacitors of distinct capacitance for producing associated distinct timer signals, each of said four capacitors being opertively connected to said interval timer.

* * * * *